Patented Sept. 5, 1933

1,926,014

UNITED STATES PATENT OFFICE 1,926,014

MANUFACTURE OF N.N'-DIACYL-COMPOUNDS OF ETHYLENE-DIAMINE AND ITS DERIVATIVES

Karl Wilhelm Rosenmund, Kiel, Germany

No Drawing. Application June 19, 1931, Serial No. 545,619, and in Germany October 31, 1929

16 Claims. (Cl. 260—124)

This application has been filed in Germany on October 31, 1929.

This invention has reference to the manufacture of acyl-compounds of diamines, and more particularly to the acyl-compounds of ethylene-diamine and its derivatives, and it is intended to facilitate the manufacture of such products, and thereby to also increase the number of products of this class. Acyl-compounds of ethylene-diamine having indentical acyl-radicals in the two amino-groups have been frequently obtained heretofore, but as far as I am aware, it has not been possible heretofore to manufacture acyl-compounds of the ethylene-diamine with different acyl-radicals.

In accordance with my invention the diacyl-compounds may be obtained by starting with the monoacyl-compounds of ethylene-diamine or with the N-alkylated ethylene-diamine with secondary amino-group and introducing into these compounds by methods otherwise known another acyl group of a monobasic carboxylic acid. The process is carried out in accordance with the following formula:—

$RCOCl + NH_2CH_2CH_2NHCOR_1 =$
$RCONHCH_2CH_2NHOCR_1 + HCl$ in which RCO and $R_1CO$ represent acyl groups, as for instance, acetyl, di-ethyl-acetyl-bromine with the formula

and like compounds.

The introduction of the acyl-radicals may be carried out with all acyl-residues of monobasic acids which may be used as chlorides, as the acids themselves or their anhydrides or esters. It has been shown by quantitative analysis of the elements present and by the fact that the products fail to possess basic properties that by this introduction into the monoacyl-ethylene-diamines the N.N' diacyl-amines mentioned in the formula are actually obtained. The mixed diacyl-compounds obtained are of great therapeutic value on account of their physiological properties.

In its generic form my invention can be described as a process of forming mixed $N:N^1$ diacyl substituted compounds of ethylene diamine by reacting together at various temperatures a compound having the generic formula $NHK—CH_2—CH_2—NK_1—COR_1$ with a compound having the generic formula R—CO—X. This reaction produces the new compounds of my invention which can be represented by the generic formula $R—CO—NK—CH_2—CH_2—NK_1—CO—R_1$ being mixed $N:N^1$ diacyl substituted compounds of ethylene diamine or of N-alkylated ethylene diamines. In the above formulæ K and $K_1$ represent hydrogen or alkyl groups, R—CO—X represents a monobasic carboxylic acid or the acid halide, the anhydride or the ester of such an acid, while R—CO— and $R_1$—CO— represent the acyl groups of different monobasic carboxylic acids.

The invention will be more fully explained by reference to the following examples, viz:—

(1) 10 grams monoacetyl-ethylene-diamine are dissolved in 20 grams water and are treated with somewhat more than the calculated amount of bromine-diethyl-acetyl-bromide having the formula

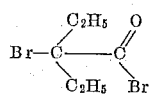

and potassium-hydroxide liquor, while agitating the liquid and keeping it cool. The resultant acetyl-bromine-diethyl-acetyl-ethylene-diamine having the formula

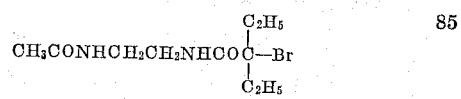

is partly precipitated as an oil, and it partly remains in the solution. The compound solidifies after being allowed to stand for some length of time, and after having been crystallized from ligroin, it has a melting point of 72° C. The yield is 70%.

(2) Propionyl-ethylene-diamine, $NH_2CH_2CH_2NHCOC_2H_5$, and bromine-isovaleryl-bromide,

are caused to react upon each other in molecular quantities. The propionyl-bromine-isovaleryl-ethylene-diamine

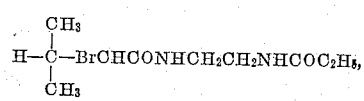

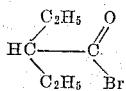

formed melts at 193° C., and the propionyl-bromine-diethyl-acetyl-ethylene-diamine

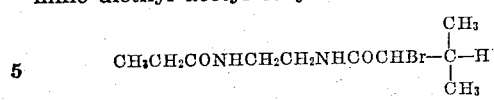

has the melting point 57–59° C. The yield is 82%.

(3) Acetyl-salicoyl-ethylene-diamine

is obtained as follows:—1.3 moles of acetyl-ethylene-diamine and 1 mole of methyl-ester of salicylic acid are heated in an oil bath to 180° C. for six hours. After cooling the product is agitated with a small amount of concentrated solution of sodium-bicarbonate, in order to remove any free salicylic acid formed. The residue is dissolved in ethyl acetate and is precipitated with petroleum ether; after re-crystallization from benzol the compound shows melting point 140–141° C. The diamine

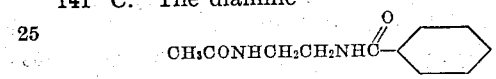

is obtained with a yield of 60%.

(4) Acetyl-benzoyl-ethylene-diamine, having the formula $$CH_3CONHCH_2CH_2NHCO—C_6H_5$$

is obtained as follows:—1.3 moles of acetyl-ethylene-diamine and 1 mole of benzoic acid are heated to 180° C. The resultant mixture is then treated with bicarbonate of soda and the residue obtained is crystallized from ethyl acetate in the form of white needles, melting at 175° C. It constitutes the desired diacyl product. The yield is 85%.

(5) Bromine-diethyl-acetyl-cyclohexyl-acetyl-ethylene-diamine

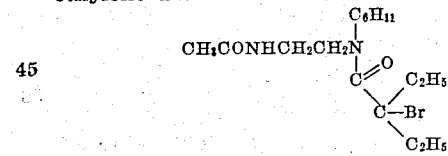

is obtained as follows:—10 grams acetyl-cyclohexyl-ethylene-diamine $$C_6H_{11}NH.CH_2—CH_2—NH.COCH_3$$

(boiling point at 2.5 mm. pressure 168–173° C.) manufactured by the catalytic reduction of a mixture of molecular quantities of acetyl ethylene-diamine and cyclo-hexanone in accordance with the following formula viz.:—

$$CH_3CONHCH_2CH_2NH_2+OC_6H_{10}+H_2=$$
$$CH_3CONHCH_2CH_2NHC_6H_{11}+H_2O$$

are shaken with the calculated amount of bromine-diethyl-acetyl-chloride

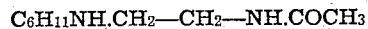

in a soda-alkaline menstruum, which causes the compound to separate out. The yield is 13 grams. The compound crystallizes from alcohol and has a melting point 104° C.

(6) Acetyl-cinnamoyl-ethylene-diamine

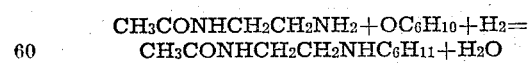

is obtained as follows:—10 grams propionyl-ethylene-diamine are shaken with the calculated amount of cinnamyl-chlorid

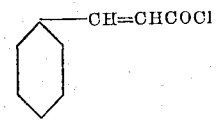

while keeping the mixture cooled. The new compound crystallizes from ethyl acetate in white needles; melting point 183° C. Yield 85%.

It should be understood that the invention is not confined to the examples herein given merely by way of illustration, nor to the quantities and mode of operation stated, except as otherwise appears from the appended claims.

The monoacyl-compounds may for instance be obtained in accordance with my co-pending application, relating to their manufacture, and bearing Serial No. 545,620, filed June 19, 1931.

I claim:—

1. N.N'-diacyl compounds of diamines having the generic formula $$RCONHCH_2CH_2NHCOR_1$$

in which RCO and $R_1CO$ represent different acyl groups.

2. Acetyl-salicoyl-ethylene-diamine,

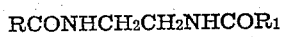

having a melting point of 140–141° C.

3. Bromine - diethyl - acetyl-cyclohexyl-acetyl-ethylene-diamine,

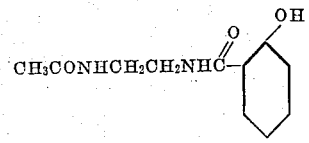

crystallizable from alcohol and possessing fluidity point 104° C.

4. Propionyl - bromine - isovaleryl-ethylene-diamine,

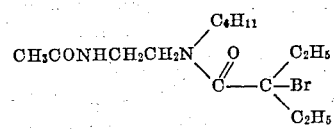

crystallizable from ethyl acetate and having a melting point of 193° C.

5. In the manufacture of mixed $N:N^1$ diacyl substituted compounds of ethylene diamine, the process which comprises reacting together, at temperatures ranging from about room temperatures to about 180° C., a compound represented by the generic formula $$NHK—CH_2—CH_2—NK_1—CO—R_1$$

with a compound having the generic formula R—CO—X, until a solid compound is formed, then recovering the solid so formed; R—CO— and $R_1$—CO— in the above formulæ representing the acyl groups of different monobasic carboxylic acids, K and $K_1$ representing hydrogen or alkyl groups and R—CO—X representing a monobasic carboxylic acid or the acid halide, the anhydride or the ester of such an acid.

6. The process of claim 5 wherein R—CO—X represents an acid halide of a monobasic carboxylic acid.

7. The process of claim 5 wherein R—CO—X represents the anhydride of a monobasic carboxylic acid.

8. The process of claim 5 wherein R—CO—X represents as ester of a monobasic carboxylic acid.

9. The process of claim 5 wherein K and K₁ represent hydrogen.

10. The process of claim 5 wherein at least one of K and K₁ represents an alkyl group.

11. The process of claim 5 wherein K and K₁ represent hydrogen and X represents a halogen atom.

12. The process of claim 5 wherein K and K₁ represent hydrogen and R—CO—X represents the anhydride of a monobasic carboxylic acid.

13. The process of claim 5 wherein K and K₁ represent hydrogen and R—CO—X represents the ester of a monobasic carboxylic acid.

14. The process of claim 5 wherein the reaction is conducted in an alkaline medium.

15. Mixed N:N¹ diacyl substituted ethylene diamines having the generic formula

R—CO—NK—CH₂—CH₂—NK₁—CO—R₁ wherein R—CO— and R₁—CO— represent acyl groups of different monobasic carboxylic acids and K and K₁ represent hydrogen or alkyl groups.

16. The products of claim 15 wherein at least one of K and K₁ represents an alkyl group.

KARL WILHELM ROSENMUND.